Dec. 31, 1946.　　　G. V. RYLSKY　　　2,413,381
ILLUMINATING MEANS FOR INDICATING INSTRUMENTS
Filed Oct. 22, 1943　　　3 Sheets-Sheet 2
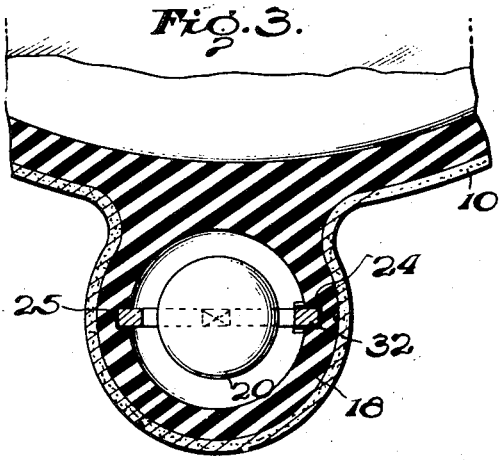
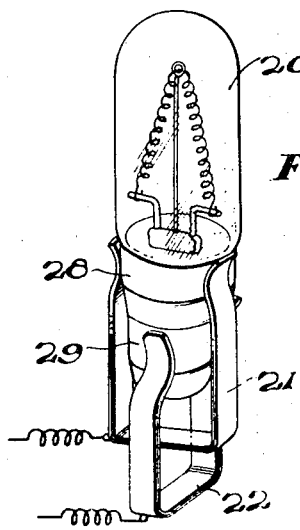
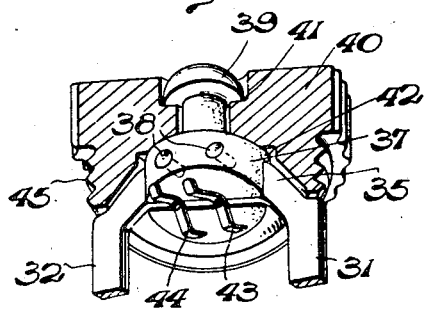
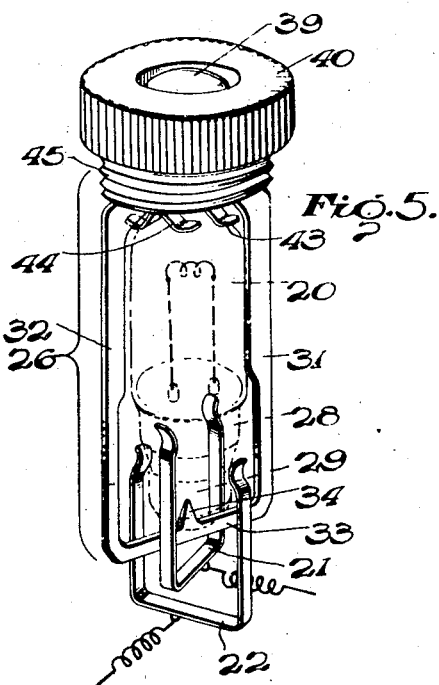
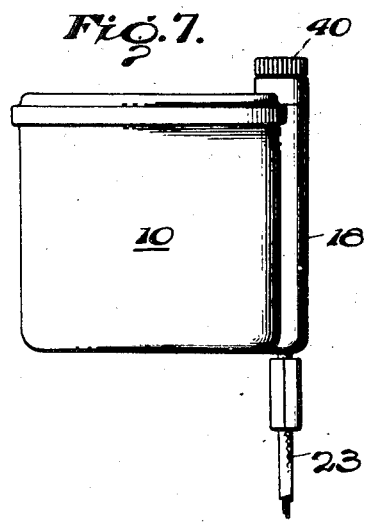
INVENTOR.
Gregory V. Rylsky
BY
Herbert M. Birch
ATTORNEY Dec. 31, 1946.  G. V. RYLSKY  2,413,381
ILLUMINATING MEANS FOR INDICATING INSTRUMENTS
Filed Oct. 22, 1943  3 Sheets-Sheet 3
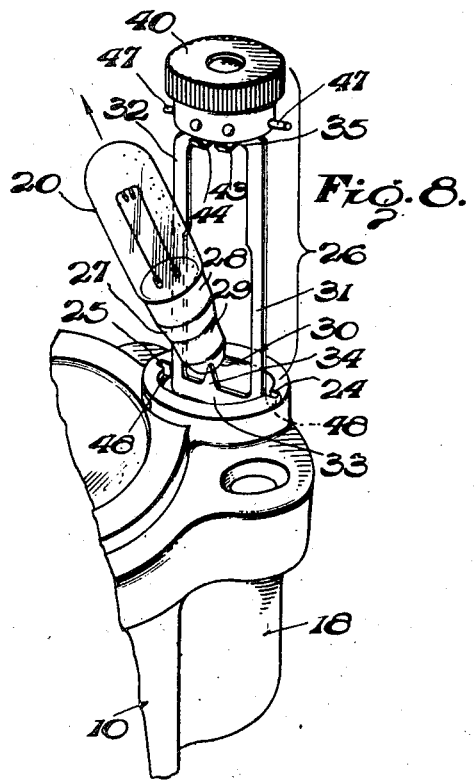
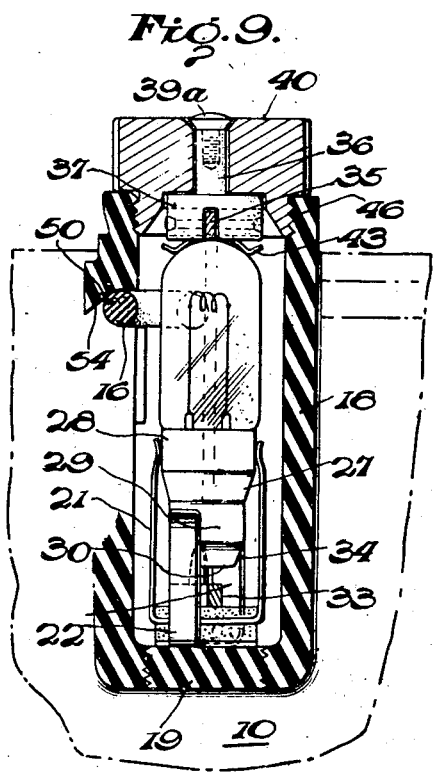
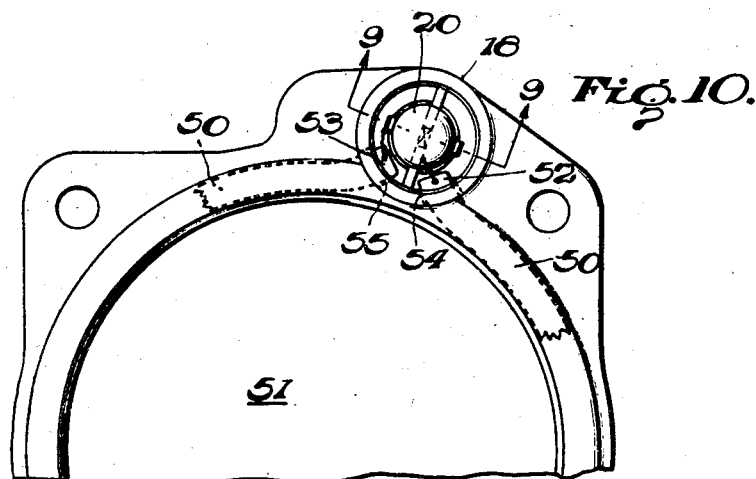
INVENTOR.
Gregory V. Rylsky
BY
Herbert M. Birch
ATTORNEY Patented Dec. 31, 1946

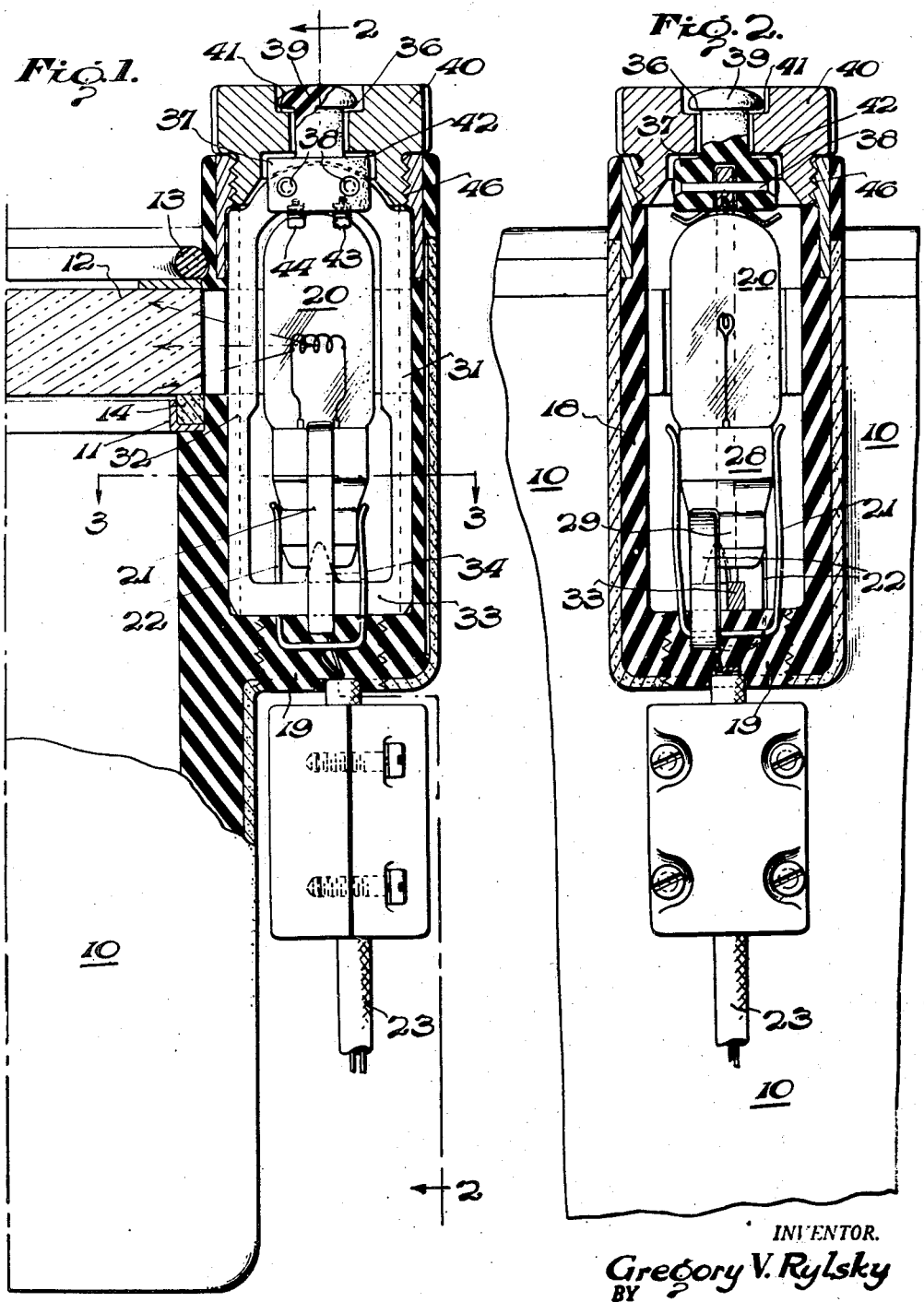

2,413,381

UNITED STATES PATENT OFFICE 2,413,381

ILLUMINATING MEANS FOR INDICATING INSTRUMENTS

Gregory V. Rylsky, New York, N. Y., assignor to Bendix Aviation Corporation, Teterboro, N. J., a corporation of Delaware Application October 22, 1943, Serial No. 507,322

8 Claims. (Cl. 240—2.1)

The present invention relates to illuminating means and more particularly to illuminating means for indicating instruments or the like.

An object of the invention is to provide improved novel illuminating means for instrument indicating surfaces, whereby the light rays are dispersed and projected around a surface by reflecting elements such as cover glass reflectors, rod reflectors or the like.

Another object of the invention is to provide a novel improvement in the prior standard type mountings for illuminating means, such as pilot lights, and miniature lamps for instruments.

A further object of the invention is to provide novel mounting means for an instrument light bulb, whereby new and old bulbs may be attached and detached from a novel mounting means quickly and simply by a slight pressure on the side of the bulb to thereby avoid breaking the glass portion of the lamps, such as is often experienced in detaching burned out lamps from screw sockets or the like.

A further object is to provide a novel detachably mounted lamp adapted to connect securely with a plurality of cooperating quick-detachable power jacks, whereby the lamp will not become loose from vibration or like causes and flickering from loose or faulty connections is thereby eliminated.

A further object is to provide a novel miniature lamp mounting comprising in combination a lamp having a novel threadless base, a novel cooperating holder for the lamp, an instrument frame having a socket adapted to receive the lamp and holder, and a novel arrangement of power jacks for the lamp base associated with the instrument frame socket to thereby provide means for connecting and disconnecting the lamp from the power jacks without the necessity of turning the lamp in the socket to remove it.

A further object is to provide a novel separable light bulb in combination with a novel separable holder therefor adapted to separably connect and disconnect the light bulb with a plurality of power jacks suitably mounted in a socket in an instrument casing, so that broken bulbs may be readily removed.

A further object of the invention is to provide a lamp having a novel lamp base adapted to be engaged and disengaged from a power supply socket by an auxiliary lamp holding means adapted to cooperatively associate with said power socket, whereby illumination of the lamp occurs when the lamp holding means with the lamp mounted therein are seated in the power socket.

A still further object of the invention is to provide in combination a novel separable pilot lamp or the like, a novel mount therefor, which is relatively inexpensive and simple to manufacture whereby the lamp mounting may be used repeatedly for new pilot lamps which may be inserted therein to replace old broken or burned out lamps.

The above and other objects and advantages of the invention will appear more fully hereinafter from a consideration of the detailed description which follows, taken together with the accompanying drawings wherein three embodiments of the invention are illustrated. It is to be expressly understood, however, that the drawings are for the purpose of illustration only and are not intended to define the limits of the invention, reference being had for this purpose to the appended claims.

In the drawings wherein like reference characters refer to like parts throughout the several views;

Figure 1 is a side longitudinal sectional view of the present invention showing the parts thereof assembled and installed within the instrument casing socket adjacent a cover glass reflector plate.

Figure 2 is a front longitudinal sectional view of the device taken along the line 2—2 of Figure 1.

Figure 3 is a transverse sectional view taken along the line 3—3 of Figure 1.

Figure 4 is a detached perspective view of the electric power jacks confined within the power socket in the instrument casing showing their points of contact with an electric bulb base designed according to my invention without the bulb frame support, so as to better show such connection.

Figure 5 is a detached perspective view similar to Figure 4 showing the relative non-short circuiting position of the bulb frame with respect to the pairs of power jacks when the bulb and frame are connected in the instrument casing power socket.

Figure 6 is a perspective view of the upper portion of the bulb holder illustrated in Figures 1, 2 and 5 and showing its manipulative coupling knob in transverse section.

Figure 7 is a side elevational view of an instrument casing with a bulb holder installed therein.

Figure 8 is a perspective view showing a manner of removing a bulb from the bulb holder and a modified form of coupling means for securing the bulb holder in place when enclosed in an instrument.

Figure 9 is a vertical sectional view on line 9—9 of Figure 10 with the coupling knob in place.

Figure 10 is a plan of an instrument showing a modified form of bulb-supporting means and a light-reflecting ring associated with the instrument and bulb, the coupling knob of the bulb-supporting means being omitted.

Referring first generally to the several parts of the assembly, shown in Figure 1, they include a novel lamp, such as a pilot light or miniature bulb, a separable lamp supporting frame and bulb, a separable lamp supporting frame and power jacks, shown in this instance as two pairs of power jacks secured within a socket, which may be formed as an auxiliary integral molded part of the instrument casing, see Figures 1 and 7, connected to a suitable source of power by a cable.

More specifically, there is provided a casing 10, which has a cover glass light reflector supporting frame portion 11 and gasket 14 on which rests cover glass reflector 12. The peripheral outer surface edge of the cover glass reflector is secured against the gasket 14 by split metal ring 13.

Novelly mounted adjacent to the peripheral edge of cover glass reflector 12, such as, for example, in an integrally molded auxiliary section of casing 10, designed to form a socket 18, is a lamp bulb 20. The socket 18 has an opening in the wall thereof opposite the edge of the cover reflector 12, so that the light rays emanating from the light bulb 20 project into and distribute through the cover glass reflector 12, as indicated by the arrows in Figure 1, to thereby illuminate any markings thereon.

The elongated lamp socket 18, may be threaded to receive a screw plug 19 in which are suitably mounted two pairs of power jacks 21 and 22 connected through cable 23, Figure 1, to any suitable source of electric current supply, not shown.

Oppositely disposed and extending longitudinally of the internal bore of the socket are elongated guide channels 24 and 25, see Figures 3 and 8, in which the lamp supporting frame 26 is adapted to slide upon insertion or removal thereof for the purpose of attachment or detachment of the lamp 20.

Lamp 20 is of novel construction and particularly at the base thereof, so as to cooperate with its supporting frame 26 and with the two pairs of power jacks 21 and 22, as best shown in Figure 5. The novel lamp base 27 comprises two annular contact areas 28 and 29, stepped one above the other, and a bottom tip portion 30 having a centrally disposed conical depression therein adapted to cooperatively center and seat the base 27 on a complementary tapered lug 34 carried by a transverse bottom bar 33 of frame 26.

The frame 26 comprises elongated flat side bars 31 and 32 adapted to trolley or slide within the aforementioned socket channels 24 and 25, a transverse bottom bar 33 joining with the side bars 31 and 32 and an arcuate lamp bulb conforming top bar 35 connected to a rivet-like member 36. The rivet-like member 36 has an enlarged base part 37, a shank and a headed portion 39 around which is mounted a knurled coupling knob 40, see Figure 6. The central portion of top bar 35 of the lamp supporting frame fits within a recess at the under side of the base 37 of member 36 and is secured to the base by auxiliary rivets 38. The coupling knob 40 is free to swivel about the head 39 and is countersunk around the head and base 37 of member 36, so as to define opposed annular shoulders 41 and 42, best shown in Figures 1 and 2, adapted to abut against either of the adjacent portions of member 36, as described hereinafter. Secured to the under portion of top bar 35 are bulb retaining and centering springs 43 and 44.

In the form of device shown in Figures 1, 2, 5, 6, 9 and 10, the knurled knob 40 is provided with exterior threads 45, so as to cooperate with complementary internal threads 46 around the mouth of socket 18.

Figure 8 illustrates another form of the device, which differs from the above only in that knurled knob 40, instead of being threaded, is provided with bayonet pins 47 adapted to cooperate with bayonet slots 48 in the rim of socket 18.

In the modification of the invention illustrated in Figure 9, the head of connecting member 36 is shown as the head of a screw 39a having a bevelled under surface in lieu of the flat under surface of the head 39 illustrated in Figures 1, 2 and 6. The screw is in threaded engagement with the shank of member 36 and is seated against the top end of the shank.

The operation and assembly of the device is very simple, assuming for example as illustrated in Figure 8, that a new lamp bulb is to be inserted in the frame 26. The frame is removed from the socket 18 and lamp 20 is mounted therein by seating lamp base 27 with the centrally depressed tip 30 over tapered lug 34 and then pushing the lamp forward into frictional contact with arcuate centering springs 43 and 44, until the bulb is centered within the arcuate seat formed thereby. With the lamp bulb and frame now assembled as one unit the frame side bars 31 and 32 are engaged with the guide grooves or channels 24 and 25, and the frame is slid downward with the bulb base foremost into the socket 18.

When frame bottom bar 33 seats against the bottom of socket 18, the power jacks 21 and 22 frictionally engage with each annular contact area 28 and 29 of bulb 20 and the same is illuminated. In Figure 5, such frictional connection between the lamp base and power jacks is illustrated, so as to show the angular relationship of each pair of power jacks with respect to the lamp bulb base and supporting frame; the relative positions being so spaced and so proportioned, that there is no danger of a short circuit between the frame 26 and the power jacks 21 and 22.

Following the connection of the bulb to the source of power and the simultaneous seating of the frame 26 within socket 18, knurled knob 40 is rotated to couple or secure the frame in the socket by threads 45, 46 or by the bayonet slot connection shown in Figure 8, shoulder 42 being adapted to engage with enlarged rivet base 37 when knob 40 is tight, and shoulder 41 being adapted to engage with the head of the rivet shank as the knob is uncoupled from the socket.

In Figures 9 and 10, there is illustrated a ring light construction, such as illustrated and described in my prior Patent 2,140,972, issued December 20, 1938. This form uses the same socket and bulb mounting arrangement. The light rays are projected around the dial by a glass reflector rod 50, which defines a ring around the instrument dial 51 to illuminate the same by reflection of light rays from the lamp 20 positioned in socket 18. The transmission of the light rays is produced through each end 52 and 53 of the reflector rod 50, which ends extend through apertures 54 and 55 in the wall of socket 18.

There is thus provided a very handy system for rapid attachment and detachment of new and old lamp bulbs, particularly miniature lamps which often become corroded in the usual type sockets at their base portions, so that their removal is very difficult and sometimes doubly so when the lamp bulb becomes broken.

Although only three embodiments of the invention have been illustrated and described, various other changes and modifications in construction, form and relative arrangement of parts, which will now appear to those skilled in the art, may be made without departing from the scope of the present invention. Reference is, therefore, to be had to the appended claims for a definition of the limits of the invention.

What is claimed is:

1. In combination, an electric lamp socket having guide means extending longitudinally thereof and power jacks connected to a source of supply, an electric lamp, a lamp holder comprising a frame having elongated side bars and an interconnecting bottom bar for said side bars, centrally disposed centering means extending from said bottom bar and resilient means depending from the top of said lamp holder adapted to cooperate with said centering means to thereby securely mount said lamp within the holder.

2. In combination with an instrument casing having a light reflector and dial supporting frame, an elongated socket associated with said casing having an aperture therein adjacent said reflector, a source of power leading to said socket, two pairs of power jacks connected to said source of power housed within the bottom of said socket, an electric bulb having a base adapted to frictionally engage with each of said pairs of power jacks, elongated guide means in the wall of said socket, and means adapted to separably mount said bulb prior to insertion thereof into said socket for connection with said power jacks, said means including side bars adapted to interfit with said elongated guide means in said socket wall to thereby facilitate attachment and detachment of said bulb from its connection with the socket.

3. In combination with an instrument to be illuminated having an indicating dial supporting frame, an elongated socket opening in a plane with said dial supporting frame, a source of power connected to said socket, two pairs of power jacks connected to said source of power housed within the bottom of said socket, an electric bulb having a base adapted to frictionally engage at separate points with each of said pairs of power jacks, elongated guides in the wall of said socket, means adapted to separably mount said bulb prior to insertion thereof into said socket for connection with said power jacks, said means including side bars adapted to interfit with said elongated guide means in said socket wall to thereby facilitate attachment and detachment of said bulb from its connection with the socket, and means adapted to lock said first named means and said bulb within said socket.

4. In combination with a power socket, an electric lamp holder comprising a frame having side bars, a bottom bar and a bulb conforming top bar, said side bars being adapted to cooperate with the wall of said socket, said bottom bar including an upstanding lug adapted to seat within a lamp base and said top bar including a plurality of resilient members adapted to frictionally engage with a lamp head when the lamp base is seated on the bottom bar lug, whereby such lamp and said frame may be inserted within said power socket as a unit.

5. In combination with a power socket, an electric lamp holder comprising a frame having side bars, a bottom bar and a bulb conforming top bar, said side bars being adapted to cooperate with the wall of said socket, said bottom bar including an upstanding lug adapted to seat within a lamp base and said top bar including a plurality of resilient members adapted to frictionally engage with a lamp head when such lamp is seated on the bottom bar lug, means supported by said top bar comprising a member having an enlarged base portion secured to said top bar, a shank portion and a head portion, and a coupling knob associated with said shank portion adapted to swivel thereon to thereby couple with means in the top of said socket and secure said lamp holder therein.

6. In combination with a power socket, an electric lamp holder comprising a frame having side bars, a bottom bar and a bulb conforming top bar, said side bars being adapted to cooperate with the wall of said socket, said bottom bar including an upstanding lug adapted to seat within a lamp base and said top bar including a plurality of resilient members adapted to frictionally engage with a lamp head when such lamp is seated on the bottom bar lug, means supported by said top bar comprising a member having an enlarged base portion secured to said top bar, a shank portion and a head portion, and a knob carried by said shank portion comprising coupling members adapted to cooperate with complementary slots in the top of said socket to thereby secure the lamp and holder in the socket.

7. An electric lamp holder comprising a flat frame having joined side bars and top and bottom bars bordering an opening for accommodating an electric lamp, a manipulative knob, means connecting said knob to the top bar of said frame for manipulation of said frame by handling said knob, means carried by said last-named means for engaging one end of an electric lamp, and means extending upwardly from the said bottom bar of said frame for engaging the other end of an electric lamp, whereby an electric lamp may be wholly supported and manipulated with said holder.

8. In an instrument to be illuminated, the combination comprising a well associated with said instrument, a coupling knob having means for engaging a portion of said well at its open end, an electric lamp holder comprising a frame having side bars and upper and lower bars connecting said side bars, means in said well for engaging the side bars of said frame, means secured to the upper connecting bar of said frame and having connection with said coupling member, means carried by said last-named means for engaging one end of an electric lamp, means extending from the lower connecting bar of said frame for engaging the base of an electric lamp, and resilient power jacks mounted in said well and including contact-members extending in the direction of the side bars of said frame, said contact-members being laterally displaceable and adapted to engage conducting surfaces on the base of an electric lamp.

GREGORY V. RYLSKY.